(12) United States Patent
Meijer et al.

(10) Patent No.: US 8,713,048 B2
(45) Date of Patent: Apr. 29, 2014

(54) QUERY PROCESSING WITH SPECIALIZED QUERY OPERATORS

(75) Inventors: Erik Meijer, Mercer Island, WA (US); Mads Torgersen, Seattle, WA (US); Anders Hejlsberg, Seattle, WA (US); Matthew J. Warren, Redmond, WA (US); John W. Dyer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1231 days.

(21) Appl. No.: 12/144,670

(22) Filed: Jun. 24, 2008

(65) Prior Publication Data
US 2009/0319499 A1   Dec. 24, 2009

(51) Int. Cl.
  *G06F 7/00* (2006.01)
  *G06F 17/30* (2006.01)

(52) U.S. Cl.
  USPC ........... 707/771; 707/769; 707/763; 707/759; 707/753; 707/711

(58) Field of Classification Search
  USPC .......... 707/771, 769, 763, 759, 711, 753, 728
  See application file for complete search history.

(56) References Cited

U.S. PATENT DOCUMENTS

| 6,487,569 | B1 * | 11/2002 | Lui et al. ........................ 715/230 |
| 6,560,607 | B1 | 5/2003 | Lassesen |
| 6,882,993 | B1 | 4/2005 | Lawande et al. |
| 6,898,604 | B1 | 5/2005 | Ballinger et al. |
| 7,107,282 | B1 | 9/2006 | Yalamanchi |
| 7,164,676 | B1 | 1/2007 | Chakraborty |
| 7,246,114 | B2 | 7/2007 | Bolognese et al. |
| 7,480,670 | B1 * | 1/2009 | Milby .................................. 1/1 |
| 7,512,626 | B2 * | 3/2009 | Chitgupakar et al. ................ 1/1 |
| 7,792,856 | B2 * | 9/2010 | Fuxman et al. ............... 707/769 |

(Continued)

FOREIGN PATENT DOCUMENTS

| EP | 0378367 A3 | 7/1992 |
| WO | WO 2007/061430 A1 | 5/2007 |

OTHER PUBLICATIONS

Hejlsberg, et al., "The .NET Standard Query Operators", Copyright: 2006, pp. 1-30 http://download.microsoft.com/download/5/8/6/5868081c-68aa-40de-9a45-a3803d8134b8/standard_query_operators.doc.

(Continued)

*Primary Examiner* — Kuen Lu
(74) *Attorney, Agent, or Firm* — Kevin Sullivan; Kate Drakos; Micky Minhas (57) ABSTRACT

Queries targeting various data sources are processed in a query processing pipeline that parses the query into a set of operations (e.g., an expression tree or a translated SQL query) using a set of query operators, each handling a particular type of operation. The query operators are often designed in an unspecialized manner, such that each query operator handles one query operation in an atomic, generic manner (e.g., sorting generic data items for an ORDER BY clause.) More efficient queries may be devised by including specialized queries that operate in common but special cases, such as a sorting of a particular data type (e.g., a floating-point number sort) or a sequence of two or more operations that are often performed together (e.g., a WHERE test of an attribute followed by a SELECT of the same attribute.) The use of specialized operators may result in the formulation of more efficient queries.

20 Claims, 4 Drawing Sheets

(56) References Cited

U.S. PATENT DOCUMENTS

| | | | |
|---|---|---|---|
| 8,131,748 B2* | 3/2012 | Held et al. | 707/769 |
| 2001/0054172 A1 | 12/2001 | Tuatini | |
| 2002/0091691 A1* | 7/2002 | Sharp | 707/7 |
| 2003/0187831 A1* | 10/2003 | Bestgen et al. | 707/3 |
| 2004/0030679 A1 | 2/2004 | Gonnet | |
| 2004/0073828 A1 | 4/2004 | Bronstein | |
| 2004/0163039 A1* | 8/2004 | Gorman | 715/505 |
| 2004/0193575 A1 | 9/2004 | Chen et al. | |
| 2004/0194057 A1 | 9/2004 | Schulte et al. | |
| 2004/0194068 A1 | 9/2004 | Warren et al. | |
| 2004/0267760 A1 | 12/2004 | Brundage et al. | |
| 2004/0267766 A1* | 12/2004 | Marek et al. | 707/100 |
| 2005/0044530 A1* | 2/2005 | Novik | 717/122 |
| 2005/0097146 A1 | 5/2005 | Konstantinou et al. | |
| 2005/0177581 A1* | 8/2005 | Sezgin et al. | 707/100 |
| 2005/0177589 A1* | 8/2005 | Venkatesh et al. | 707/102 |
| 2005/0183071 A1 | 8/2005 | Meijer et al. | |
| 2005/0262124 A1 | 11/2005 | Christensen et al. | |
| 2006/0053159 A1 | 3/2006 | Aridor et al. | |
| 2006/0064412 A1* | 3/2006 | Cunningham et al. | 707/3 |
| 2006/0212418 A1 | 9/2006 | Dettinger et al. | |
| 2006/0253430 A1 | 11/2006 | Fernandes et al. | |
| 2006/0288047 A1 | 12/2006 | Chron et al. | |
| 2007/0006128 A1 | 1/2007 | Chowdhary et al. | |
| 2007/0006145 A1 | 1/2007 | Hill et al. | |
| 2007/0027849 A1 | 2/2007 | Meijer et al. | |
| 2007/0027905 A1 | 2/2007 | Warren et al. | |
| 2007/0050348 A1 | 3/2007 | Aharoni et al. | |
| 2007/0083807 A1 | 4/2007 | Shaudys et al. | |
| 2007/0088699 A1* | 4/2007 | Edmondson | 707/7 |
| 2007/0174763 A1 | 7/2007 | Chang et al. | |
| 2007/0219973 A1 | 9/2007 | Cui et al. | |
| 2007/0226196 A1 | 9/2007 | Adya et al. | |
| 2007/0226203 A1 | 9/2007 | Adya et al. | |
| 2007/0271233 A1 | 11/2007 | Hejlsberg et al. | |
| 2009/0276428 A1* | 11/2009 | Ahn et al. | 707/7 |
| 2009/0319496 A1 | 12/2009 | Warren et al. | |
| 2009/0319497 A1 | 12/2009 | Bolognese et al. | |
| 2009/0319498 A1 | 12/2009 | Zabokritski et al. | |
| 2009/0327220 A1 | 12/2009 | Meijer et al. | |

OTHER PUBLICATIONS

Meijer Erik, "LINQ 2.0: Democratizing the Cloud", pp. 1-4 http://2007.xtech.org/public/asset/attachment/184.

"Expression Trees in LINQ", Copyright: 2007, 1 Page http://msdn2.microsoft.com/en-us/library/bb882636.aspx.

"Source and Target Operators", 34 Pages http://download.oracle.com/docs/cd/B31080_01/doc/owb.102/b28223/ref_src_tgt_opers.htm#i1175826.

"XQuery Operators", Copyright: 2005-2007, 6 Pages http://www.xquery.com/tutorials/guided-tour/xquery-operators.html.

U.S. Appl. No. 12/144,634, filed Jun. 24, 2008, Bolognese et al.

U.S. Appl. No. 12/144,630, filed Jun. 24, 2008, Warren et al.

U.S. Appl. No. 12/144,639, filed Jun. 24, 2008, Zabokritski et al.

U.S. Appl. No. 12/145,523, filed Jun. 25, 2008, Meijer et al.

Box et al. "The LINQ Project .NET Language Integrated Query", Date: May 2006, 31 Pages.

Champion Michael "NET Language-Integrated Query for XML Data", Date: Feb. 2007, pp. 1-27, http://msdn2.microsoft.com/en-us/library/bb308960.aspx.

Hall Tim, "Bulk Collection of DML Results", Date: 2006, 5 Pages, http://www.dba-oracle.com/plsql/t_plsql_dml.htm.

Hall Tim, "Bulk Update Operations", Date: 2006, 4 Pages, http://www.dba-oracle.com/plsq/t_plsql_bulk_update.htm.

Kostoulas, et al., "XML Screamer: An Integrated Approach to High Performance XML Parsing, Validation and Deserialization", Proceedings of the 15th international conference on World Wide Web, Date: May 23-26, 2006, pp. 93-102, Publisher: ACM New York, NY, USA.

Meijer, et al. "Visual Studio Developer Center", Date: Feb. 2007, pp. 1-7, http://msdn2.microsoft.com/en-us/library/ms364068(VS.80).aspx.

Meijer et al., "XLinq: XML Programming Refactored (The Return of the Monoids)", 18 Pages, http://research.microsoft.com/~emeijer/Papers/XMLRefactored.html.

"Oracle PL/SQL Programming Guide to Oracle 8i Features", 6 pages, http://www/unix.org.ua/orelly/oracle/guide8i/ch05_02.htm.

* cited by examiner

QUERY PROCESSING WITH SPECIALIZED QUERY OPERATORS

BACKGROUND

Queries of data sources (e.g., SQL queries applied against a relational database, or in-memory queries against queryable local objects) are often written in a programming language, such as a source code for an application. A query written in one manner (e.g., a language-integrated query specified according to a programming language) is often processed by a query processing pipeline, which interfaces the query with the data source by parsing the query, translating it into a more easily managed form (e.g., SQL or an expression tree), serializing any objects or values used in the query, and sending the translated query to the data source. The query processing pipeline may also receive a query result, such as a result data set, and may present it to the rest of the application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Query processing pipelines often involve one or more query operators, which are components configured to provide querying services (e.g., parsing the query, validating the syntax, and generating a translation) for a particular query term, such as SELECT, WHERE, JOIN, ORDER BY, etc. The query processing pipeline may therefore parse the query by selecting a query operator for respective query terms, and by invoking the selected query operators to generate appropriate elements of the translated query.

These query operators are often designed in a simple, broad manner that focuses on a single operation and on a maximally broad range of data types, such as a SORT operation applied to any comparable objects or values. This RISC-like configuration provides a reduced set of query operators that each applies to a broad range of operations. However, more particular types of queries may often arise within queries. As a first example, while sorting may often be performed on any types of comparable objects or values, it is often applied to sort text strings in alphanumeric order. As a second example, some operations may often be performed in a particular sequence, such as a test-and-select operation that first applies a WHERE conditional test to a particular attribute, and if the condition is satisfied, selects the attribute into the result data set.

If these types of more specialized operations arise with sufficient frequency, it may be advantageous to devise one or more specialized query operators that are capable of processing a specialized type of operation (e.g., an operation that is often applied to a particular data type, or a set of operations that are often applied in a particular sequence.) The specialized query operators may coexist in the query operators set alongside the unspecialized query operators, and may be included in a selected sequence of query operators in order to process a query. For example, a query processor may attempt to select specialized query operators for a portion of the query (e.g., an operation that is performed in the query on objects or values of a known type), and if no specialized query operator can be found, the query processor may select unspecialized query operators to handle the query portion. The inclusion of specialized query operators may improve the efficiency of the processing, and may enhance the performance of the query processor.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Queries against data sources (such as relational databases and queryable local objects) may be devised in many computing scenarios, such as data-driven applications and websites rendered from content management systems. A query is conventionally written in a language, such as a general query language (such as SQL), a domain-specific query language, or a programming language (such as a language-integrated query), and specifies the logical operations to be performed on a data source in order to retrieve a desired set and shape of data from the data source and/or to alter the data source in a desired manner.

A query written in a language is often processed in order to issue the query against the data source. This processing may involve, e.g., validating the syntax of the query according to the conventions of the language, transforming the query into a form that is more easily processed by the data source (such as an expression tree), and serializing local objects to be used in the query. The query may then be delivered to the data source (e.g., a relational database server) for application against the data source. If the application results in a response, such as an indication of query success or completion or a result data set retrieved by the query, the processing may also involve receiving and handling the response, e.g., by deserializing one or more objects representing the result data set. Together, these processing aspects form a query processing pipeline that provides a variety of services while operating as an interface between the query and the data source.

Query processing pipelines are often designed predominantly to handle the four basic types of queries: CREATE or INSERT queries, which insert new records or objects into the data source; READ or SELECT queries, which retrieve data from the data source; UPDATE queries, which modify data already in the data source; and DELETE queries, which remove records or objects from the data source. Other types of queries may also be available, such as queries that explore or modify the structure of the data source, but these four types of queries often comprise the bulk of interactions with the data source.

In order to handle the four predominant types of queries (CREATE/INSERT, READ/SELECT, UPDATE, and DELETE), query processing pipelines are often configured with a set of query operators that are configured for one of these actions, such as an insert query operator, a select query operator, an update query operator, and a delete query operator. Other query operators may be included to handle other operations of the query (e.g., a join query operator may be provided for operations that involve connecting different sets of relationally linked data; a sum query operator may be provided for operations that involve adding a series of values; and a sort query operator may be provided for operations that involve sorting values.) These query operators may provide a variety of services in the query processing pipeline, such as validating the syntax and logic of the specified operation and generating SQL or a node of an expression tree representing the specified operation. The processing of the query may then involve parsing the query to identify the types of operations specified in the terms of the query, selecting an appropriate query operator for respective terms of the query, and invoking the query operators to perform a service (such as generating SQL) for these query terms.

These query operators are often configured to operate in a simple, generic manner that performs one operation on a broad range of object or value types. For example, a UNION query operator is often configured to merge two sets of data, regardless of the types of data contained therein, and with a minimum of additional activity or side-effects. Similarly, a SORT query operator is often configured to sort any type of comparable object or value, and the sorting logic of precedence is relegated to the types of objects and values being sorted (e.g., upon receiving two objects to be sorted, the query operator does not attempt to identify which object precedes the other, but rather asks the class of the objects to make a decision for these two class instances.) A query may then be processed by generating a sequence of simple query operators, each performing a minimum of processing on a broad range of data types. It may be appreciated that this approach resembles a reduced instruction set (RISC) architecture having a constrained set of simple instructions.

Figure 1:
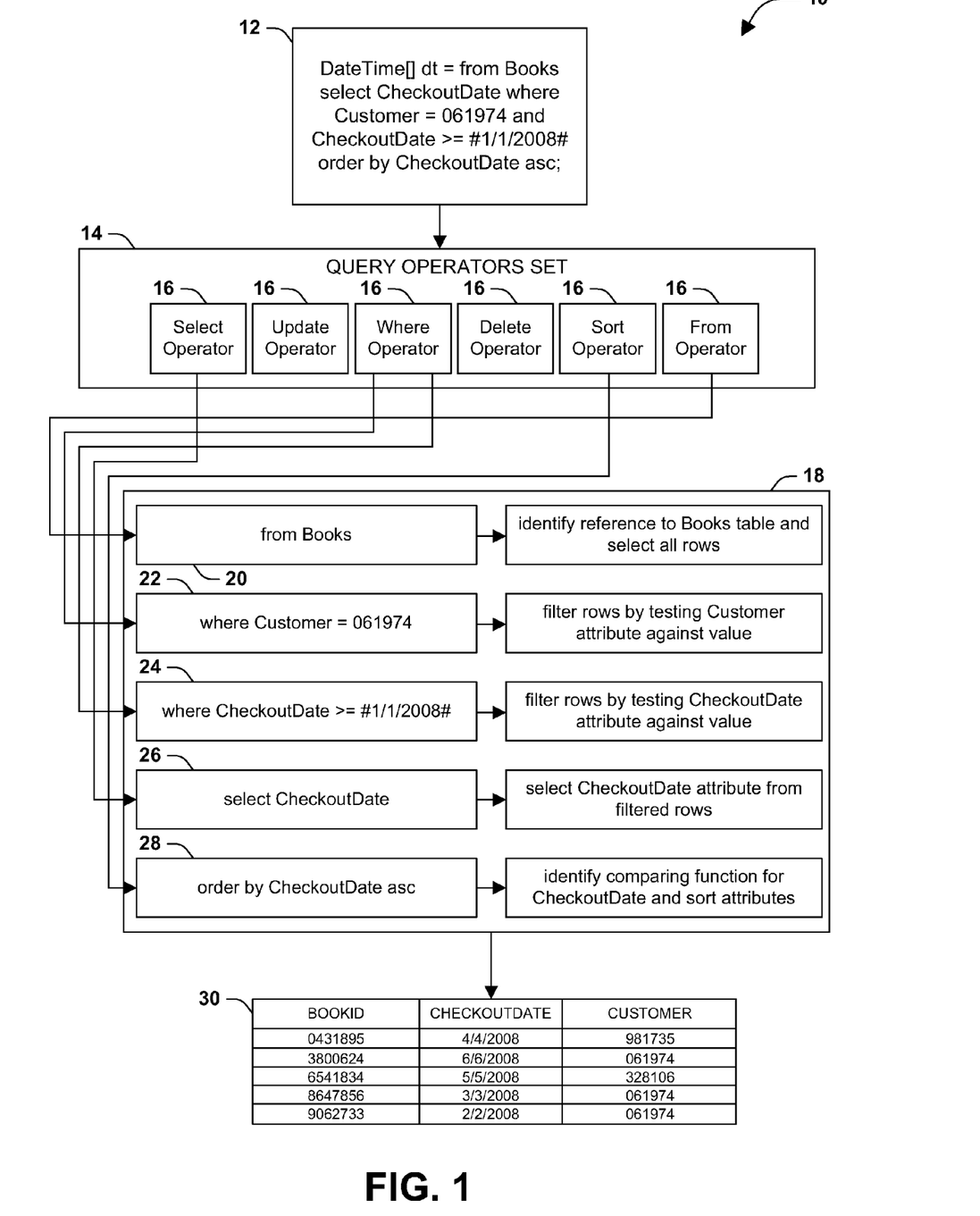
FIG. 1 is an illustration of a processing of a query to produce a query processing solution using a set of unspecialized query operators.

FIG. 1 illustrates an exemplary scenario 10 involving the processing of a query 12 that is processed in anticipation of application against a data source 30, where the processing involves the preparation of a processing solution 18 that defines the logical operations to be performed in order to apply the query. The processing may be included, e.g., in a query processing pipeline that serves as an interface between the query 12 and the data source 30, such as may be included in a compiler, interpreter, a programming library that may invoked by data-driven applications, or a data source manager that accepts many types of queries for application to a data source. The processing solution 18 is generated through the parsing of the query 12 and the selection of a sequence of query operators 16 from a query operators set 14, which may be invoked to generate portions of a translated query that may be applied to the data source 30. For example, and as illustrated in FIG. 1, the query 12 may be formulated as a language-integrated query in a programming language, and the translated query may comprise one or more SQL relational queries that may be applied to a relational database managed by a relational database server.

In the exemplary scenario 10 of FIG. 1, the data source 30 describes a set of books available at a library, and in particular a table indicating the checked-out status of particular books, comprising three attributes: the ID of a book, the date that the book was checked out, and a customer ID identifying the borrower of the book. The query 12 requests a set of dates of books checked out of the library by a particular borrower (with customer ID 061974) in calendar years 2008 and beyond, which is to be sorted in ascending order by date. The query 12 is parsed to identify the logical operations to be invoked, including a FROM operation 20 that identifies the table in the data source 30 to be queried; a first WHERE operation 22 that filters the rows of the table according to the customer ID; a second WHERE operation 24 that further filters the rows of the table according to the checkout date; a SELECT operation 26 that retrieves the checkout date attributes of the filtered rows; and an ORDER BY operation 28 that sorts the checkout date attributes in ascending order. Each operation may be handled by a particular query operator 16 capable of handling such operations; e.g., a sort query operator may be selected to handle the ORDER BY operation 28. Once a sequence of query operators has been selected, the selected query operators may be invoked to generate translated query components (e.g., SQL clauses) that correspond to these operations. The processing solution 18 may then be assembled by aggregating the translated query components that specify the details and sequence of these operations.

While this type of query operators set may promote the robustness of the query processing, it may be inefficient in other respects. As a first example, a type of operation may often be processed on a particular data type; e.g., while a SORT query operator may generally apply to any type of comparable objects or values, it is often applied to sorting strings by alphabetic priority, and sorting numbers by magnitude. However, an unspecialized sort query operator may not presume that the objects being sorted are of a particular or uniform type, because a sort operation may be applied to a heterogeneous set of objects or values (e.g., a number, a string, and a class instance), and these different objects may indeed be comparable based on some IComparable interface implementations associated with respective data types. Therefore, an unspecialized sort query operator may compare any two objects or values by identifying the types thereof, identifying a comparing function that can compare objects of such types, and invoking the comparing function to determine the relative ordering of the two objects or values. While this unspecialized sorting may exhibit an advantageous robustness, it may be disadvantageously slow where the objects are of a uniform and known type (e.g., a set of strings), and the operator may unnecessarily identify the type of each string and may repeatedly seek the same comparing function to sort respective strings. Moreover, some particular types of data may be sorted in an efficient manner (e.g., a set of numeric values may be quickly sortable by a radix exchange, and text strings may be efficiently sorted by various techniques relating to the nature and formatting of the text strings), but an unspecialized sort query operator may be unable to utilize such efficiencies because of the generic nature of the data that the unspecialized query operator is configured to handle.

As a second example, while the atomic nature of unspecialized operators may enhance the robustness of the query language by extending the range of queries that may be specified and handled, the atomicity may not reflect common pairings of operators that are often performed in a particular sequence. For example, many queries may involve a test-and-select sequence, where a particular attribute of items in a data source is tested against one or more criteria, and the attributes that fulfill the criteria are selected into the result data set (e.g., "select attribute A where A< >X".) This sequence may be handled by an unspecialized WHERE query operator that tests the attribute and an unspecialized SELECT query operator that selects the attributes that fulfill the criteria. However, the use of two query operators may be inefficient; e.g., the attribute of a record may be retrieved by the WHERE query operator and tested, and if the record passes the test, the same attribute of the record may be retrieved again by the SELECT query operator for inclusion in the result data set. The use of two query operators in this operation, and the redundant retrieval of the attribute, may represent an inefficiency in the processing of the query.

Turning again to FIG. 1, the processing solution 18 derived from the query 12 exhibits both types of inefficiency due to the selection of unspecialized query operators in the processing solution 18. As a first example, the ORDER BY operation 28 is not informed that the selected attributes are both uniform and of the string type, and the unspecialized sort query operator may specify a generic sorting of objects that involves identifying a comparing function for any two objects and invoking the comparing function. As a second example, the second WHERE operation 24 is handled by an unspecialized where query operator, and the SELECT operation 26 is handled by an unspecialized select query operator. The where query operator specifies that the CheckoutDate attribute of the records of the data source 30 is to be tested against a particular value, which may lead to particular records being flagged for inclusion in a result data set. The select query operator then specifies that the CheckoutDate attribute of the included records is to be retrieved into the result data set. As a result, each CheckoutDate attribute is operated upon twice, and may be retrieved twice from the data source 30; this represents an inefficiency that may cause a significant reduction of performance in the processing of the query 12 against the data source 30.

The inefficiencies exhibited in the exemplary scenario 10 of FIG. 1 arise from the unspecialized nature of the query operators 16 in the query operators set 14. Such unspecialized operators are often included in the query operators set 14 to ensure that the full range of syntactically and logically valid queries may be processed. However, the inefficiencies may be reduced by adding specialized query processors to the query operators set 14 that may handle specialized operations of different types. As a first example, if query processors are often selected to sort strings and numbers, it may be advantageous to include in the query operators set 14 a first specialized SORT query operator for sorting strings and/or a second specialized SORT query operator for sorting numbers, which may coexist in the query operators set alongside the unspecialized, generic SORT query operator. As a second example, if two or more operations are often performed in a particular sequence (such as a WHERE operation applied to test an attribute followed by a SELECT operation that retrieves the attribute into a result data set), it may be advantageous to include in the query operators set 14 a specialized query operator that performs both operations, and coexists in the set of specialized query operators alongside the unspecialized, atomic WHERE and SELECT query operators. This specialized query operator may reduce the number of query operators involved in the processing of the query, and may provide a more efficient processing of the query (e.g., by specifying two operations on a particular attribute, rather than a first operation on an attribute and a second operation that happens to pertain to the same attribute.)

Accordingly, a query operators set may be devised comprising unspecialized query operators for handling atomic, generic operations, as well as at least one specialized query operator that handles a specialized operation (e.g., an atomic operation applied to a particular object or value type, or a non-atomic sequence of operations applied generically to objects and values of any suitable type.) A query may again be processed by selecting a sequence of query operators that together embody the structure and logic of the query, but the selected query operators may include one or more specialized query operators, which may be connected in the sequence with other specialized and unspecialized query operators. If the query operator selector can identify a specialized operation for a portion of the query (e.g., a sorting of values or objects of a known type), a specialized query operator may be selected for processing the portion; otherwise, one or more unspecialized query operators may be selected for processing the portion. The selected sequence of specialized and unspecialized query operators may therefore lead to a more efficient processing of the query than a sequence of unspecialized query operators.

Figure 2:
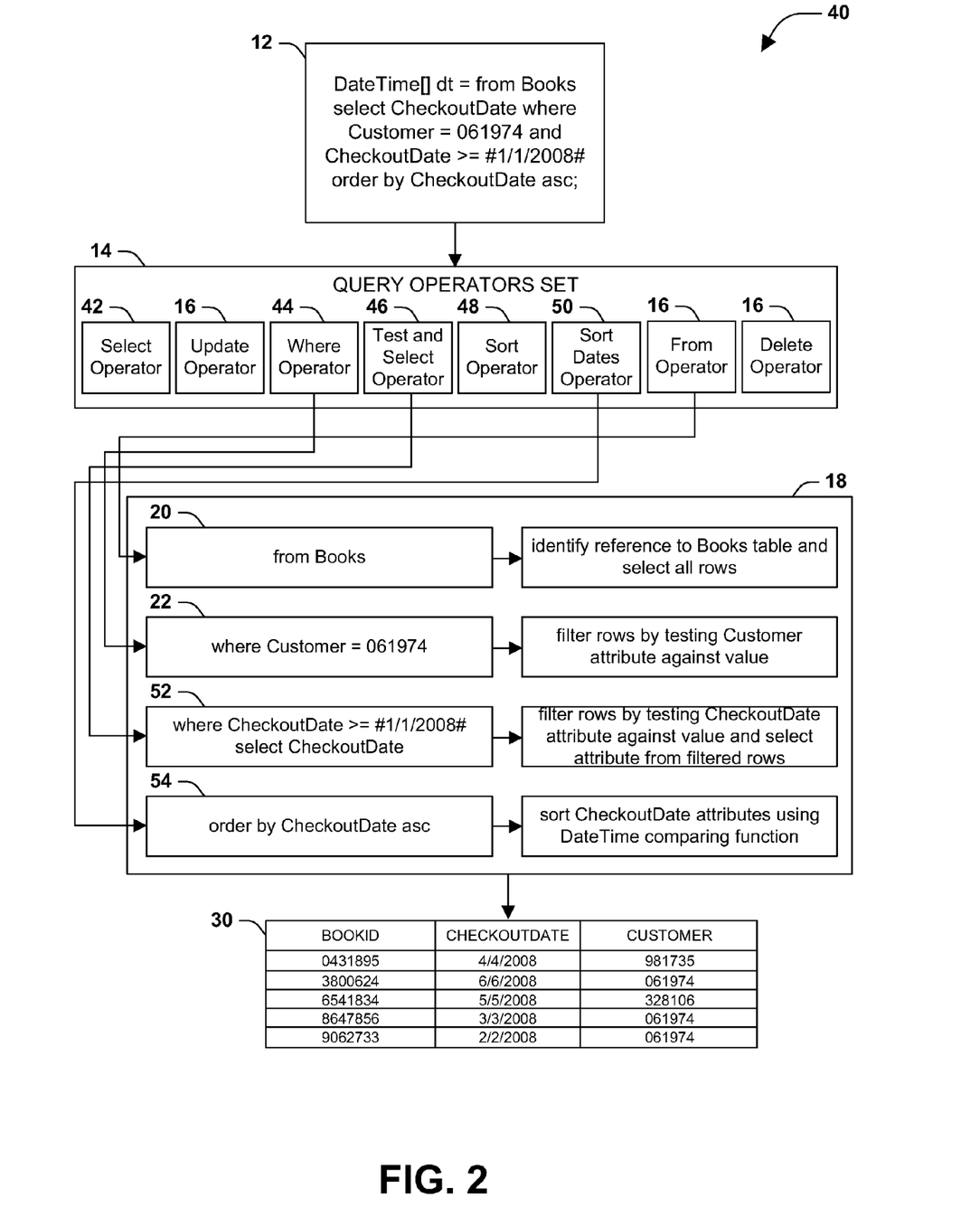
FIG. 2 is an illustration of a processing of a query to produce a query processing solution using a set of specialized and unspecialized query operators.

FIG. 2 illustrates an exemplary scenario 40 wherein the query 12 of FIG. 1 is processed for application to the data source 30, but where the query operators set 14 includes both specialized and unspecialized query operators. As a first example, the query operators set 14 includes an unspecialized select query operator 42 that specifies a retrieval of sets of attributes for inclusion in a result data set, and an unspecialized where query operator 44 that specifies a testing of attributes according to criteria specified in the query. However, the query operators set 14 also includes a specialized test and select query operator 46 that combines these two operations by specifying a retrieval of the attribute, a testing according to the criteria specified in the query, and an including in the result data set of attributes that fulfill the criteria. As a second example, the query operators set 14 includes an unspecialized sort query operator 48 that specifies a generic sorting of two sets of data (such as two values, two objects, or an object and a value) by identifying an appropriate comparing function, invoking the comparing function, and using the comparing result. However, the query operators set 14 also includes a specialized date-sorting query operator 50 that specifies sorting of on date-type values, and may be particularly well-suited to sorting date values in an efficient manner.

As illustrated in FIG. 2, a query operators set 14 comprising both unspecialized query operators and specialized query operators may be utilized to produce a better processing solution 18 for many types of queries 12 than a query operators set 14 comprising only unspecialized query operators. As in FIG. 1, the processing solution 18 for the query 12 in FIG. 2 includes a selection of the unspecialized from query operator to handle the FROM operation 20 and the unspecialized where query operator 44 to handle the first WHERE operation 22. However, the second WHERE operation and the SELECT operation are combined into a specialized TEST AND SELECT operation 54 handled by a specialized test and select query operator 46, which specifies a more efficient processing due to the specialized sequence of operations (e.g., by eliminating the redundant second accessing of the attributes illustrated in the less efficient processing solution 18 of FIG. 1.) Also, the ordering is now handled by a specialized date-sorting query operator 50 that specifies a specialized ORDER operation 54 particularly suited for sorting a uniform set of date values in a more efficient manner. The resulting processing solution 18 may therefore exhibit some efficiencies that improve the application of the query 12 against the data source 30 and the performance of data-driven applications consuming the result data set of the query 12.

Figure 3:
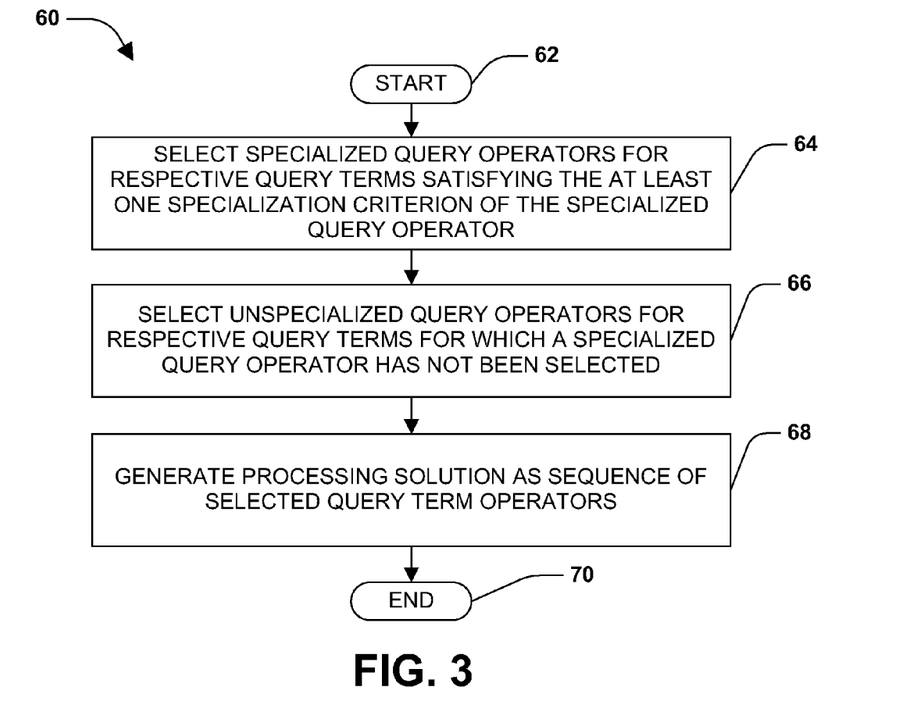
FIG. 3 is a flow chart illustrating an exemplary method of generating a query processing solution for a query from a query operator set comprising both specialized and unspecialized query operators.

FIG. 3 illustrates a first embodiment of these techniques, comprising an exemplary method 60 of generating a query processing solution for a query from a query operator set comprising at least one unspecialized query operator configured to perform a query task on at least one unspecialized data type and at least one specialized query operator configured to perform at least one query task when at least one specialization criterion is satisfied. This exemplary method 60 may be included, e.g., in a query processing component that interfaces between queries and a data source, which may be included in a compiler, an interpreter, etc. The exemplary method 60 begins at 62 and involves selecting 62 specialized query operators for respective query terms satisfying the at least one specialization criterion of the specialized query operator. The exemplary method 60 also involves selecting 66 unspecialized query operator for respective query terms for which a specialized query operator has not been selected. The exemplary method 60 also involves generating 68 the query processing solution as a sequence of selected query term operators. Having achieved the generation of a query solution using specialized query operators (where suitable for various portions of the query) and unspecialized query operators for the remaining portions of the query, the exemplary method 60 thereby formulates an efficient query processing solution, and so ends at 70.

Figure 4:
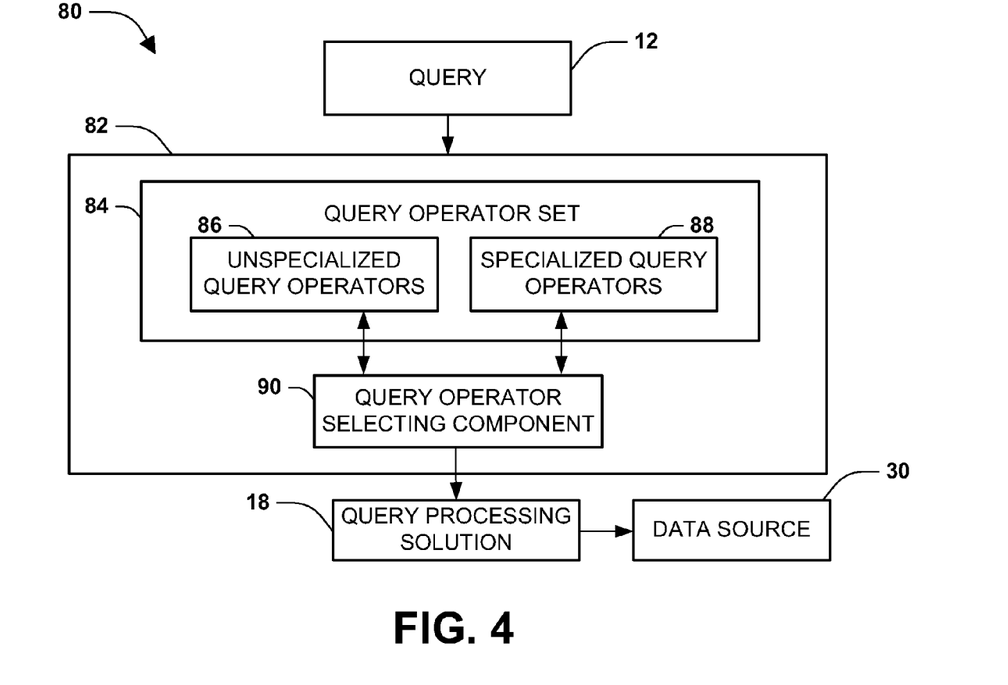
FIG. 4 is a component block diagram illustrating an exemplary system for generating a query processing solution for a query from a query operator set comprising both specialized and unspecialized query operators.

FIG. 4 illustrates an exemplary scenario 80 featuring a second embodiment of these techniques, comprising an exemplary system 82 for generating a query processing solution 18 for a query 12 to be applied against a data source 30. The exemplary system 82 includes a query operator set 84 that includes at least one unspecialized query operator 86 that is configured to perform a query task on at least one unspecialized data type, and at least one specialized query operator 88 that is configured to perform at least one query task when at least one specialization criterion is satisfied. The specialization criterion may comprise, e.g., the processing of a particular type of data, such as a particular object type or a particular value type, or the processing of a sequence of operations in a particular and common order. The exemplary system 82 also includes a query operator selecting component 90, which is configured to select a specialized query operator 88 for respective query terms satisfying the at least one specialization criterion of the specialized query operator 88, to select an unspecialized query operator 86 for respective query terms for which a specialized query operator 88 has not been selected. The query operator selecting component 90 is also configured to generate the query processing solution 18 as a sequence of selected query operators. By generating the query processing solution 18 as a sequence of specialized and unspecialized query operators, the exemplary system 82 facilitates the efficient application of the query 12 to the data source 30.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 3 and the exemplary method 82 of FIG. 4) to confer individual and/or synergistic advantages upon such embodiments.

A first aspect that may vary among implementations relates to the types of queries processed according to these techniques, and the types of query processors in which such techniques may be utilized. A first example involves a language-integrated query, where a conventional programming language is extended to include some syntax and supporting libraries for specifying queries. A language-integrated query differs from a non-language-integrated query, where the query is specified as a separate data construct that is handled by components of the programming language (e.g., as a text string that is simply generated and passed to the query processor), and where the syntax is not parsed and does not directly interact with other components of the first language. By contrast, a language-integrated query is specified according to the syntax of the programming language, and the logical constructs of the query may be evaluated and compiled by the compiler as operations. The query 12 in FIG. 1 illustrates one such language-integrated query, wherein the query syntax is specified in an object-oriented programming language that directly interacts with functions and objects of the source code. In processing the query, a compiler might utilize a query processing pipeline that translates the language-integrated query into a translated query specified in a query language (e.g., SQL), and this query might then be sent to an SQL-compatible query processor. Alternatively, the compiler might generate a set of instructions that comprise the logic of the query, such as an expression tree having nodes that represent particular operations that are connected to indicate the logical sequence of application to the data source. As a second alternative, these techniques might be included in a programming library, such as a runtime, that serves as an interface between a data-driven application having one or more queries and the data source to which the queries are to be applied. The programming library might receive queries from executing applications, process the queries through a query processing pipeline, and mediate the delivery of the query to the data source and the return of a result data set in response to the query. The programming library might also receive and execute queries on behalf of executing applications against queryable local objects; this may be advantageous for improving the local performance of the querying and, by extension, the data-driven application. As a third alternative, these techniques may be included in a manager of the data source, such as a database server capable of receiving and processing queries specified in many types of languages. The database server might therefore comprise the data store targeted by the query, and a query applying component configured to apply the query processing solution to the data store. Those of ordinary skill in the art may devise many types of queries and query processors to which the techniques discussed herein may be applied.

A second aspect that may vary among embodiments of these techniques relates to the manner in which the specialized query operators are specialized, as distinguished from the unspecialized query operators. A specialized query operator may be formulated as one or more operations that may handle a portion of a query that meets one or more specialization criteria. As a first example, a specialized query operator might specify that the query performs at least two query tasks specified in at least two query terms. The specialized test and select query operator 46 in FIG. 2 exhibits one such specialization criterion, and is applicable to a portion of a query that comprises a WHERE operation in a first query term that operates on a particular attribute followed by a SELECT operation in a second query term that selects the particular attribute. Other such combinations may be specified as specialization criteria, such as a sequence of three or more operations that are commonly invoked together (e.g., "select*from [table] where [attribute]=[value]" may be sufficiently common to motivate the development of a specialized conditional row selector query operator that combines a FROM operation, a WHERE operation, and a full-row SELECT operation.) This type of specialization may produce specialized efficiencies in the synergy of the operations (e.g., instead of retrieving and testing an attribute to fulfill a WHERE operation, and then retrieving the attribute again in a SELECT operation that produces the result data set, the attribute may be retrieved, tested, and included in the result data set in one operation.)

As a second example of this second aspect, a specialization criterion of a specialized query operator might specify at least one data type involved in the query task. The specialized date sorting query operator 50 in FIG. 2 is one such specialized operator that specifies the performance of the sort operation on data items of the DateTime type. This type of specialization may permit type-specific enhancements of the operation for specialized types of data; e.g., a sort operation specialized for sorting numeric values may utilize a radix exchange sorting technique, while a sort operation specialized for sorting text strings may utilize text comparison techniques, both of which may be faster than a generic sorting technique.) Alternatively or additionally, the specialization criterion of such a specialized query operator might specify a property of a data type; e.g., the specialized query operator might be applied to any type of object supporting a particular interface. This type of specialization may permit the development of more efficient query operators to be applied to particular types of data. For example, this type of specialization may permit the query processing solution to avoid an unnecessary typecasting in a translated query; e.g., whereas an unspecialized select query operator might produce an SQL query such as "select i as int" (which requires a typecasting of the retrieved attribute), a specialized select query operator that is specialized for integer types might produce an SQL query such as "select i" for an attribute that is known to be an integer. Moreover, the specialization might be applied to avoid typecasting an entire aspect of a data set; e.g., a specialized query task may apply to the data set comprising objects of the specified data type. Thus, a language-integrated query specifying "int[ ] i=from <table> select Integer.Cast<x> . . . " may be processed to eliminate the casting of the entire array if the <x> attributes are known to be of integer types. Also, this type of specialization may be layered to produce even greater efficiencies. As a first example, a first specialized query operator may specify a query task involving a first data type (e.g., a number), and a second specialized query operator specifying the query task involving a second data type that is more specific than the first data type of the first specialized query operator (e.g., a floating-point number.) The selection of query operators may therefore use a highly specialized query operator for a very particular type of data such as floating-point numbers, less specialized query operator for a more general class of data such as numbers, and a generic query operator for other or unknown data types.

A third aspect that may vary among implementations of these techniques relates to the selecting of query operators from a query operator set comprising both specialized query operators and unspecialized query operators. As illustrated in FIG. 3, the selecting may involve attempting to identify and select specialized query operators for various portions of the query, and then identifying and selecting unspecialized query operators for the portions of the query for which a specialized query operator has not been selected. As another variation, a query operator may attempt to detect whether a more specialized query operator is available to perform the operation in a more efficient manner for a particular query portion. For example, an unspecialized sorting query operator selected to sort a set of numbers in the query may be capable of checking with the query operators set to determine whether a specialized number-sorting query operator is available; if so, the unspecialized sorting query operator may recommend the more specialized query operator to handle the query portion. Moreover, the specialized number-sorting query operator may in turn check to see if an even more specialized sorting query operator is available to handle the particular types of numbers involved in the query portion (e.g., a specialized floating-point-number sorting query operator for sorting floating-point numbers), and may recommend the even more specialized query operator if it is available. One manner of combining these techniques may involve parsing the query by initially selecting unspecialized query operators for each query term and recursively asking each selected query operator to check whether a more specialized query operator is available. Once each selected query operator indicates that a more highly specialized query operator cannot be found for a particular query portion, the selected query operators may be invoked to generate the query processing solution. Alternatively or additionally, the data types may be able to recommend query processors for a particular operation; e.g., the query processing pipeline might identify the class of an object involved in a portion of a query, and may ask the class of the object to recommend or provide a specialized query operator for handling the object in the query. Those of ordinary skill in the art may be able to devise many ways of selecting a set of query operators from among the set of specialized and unspecialized query operators in accordance with the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 5:
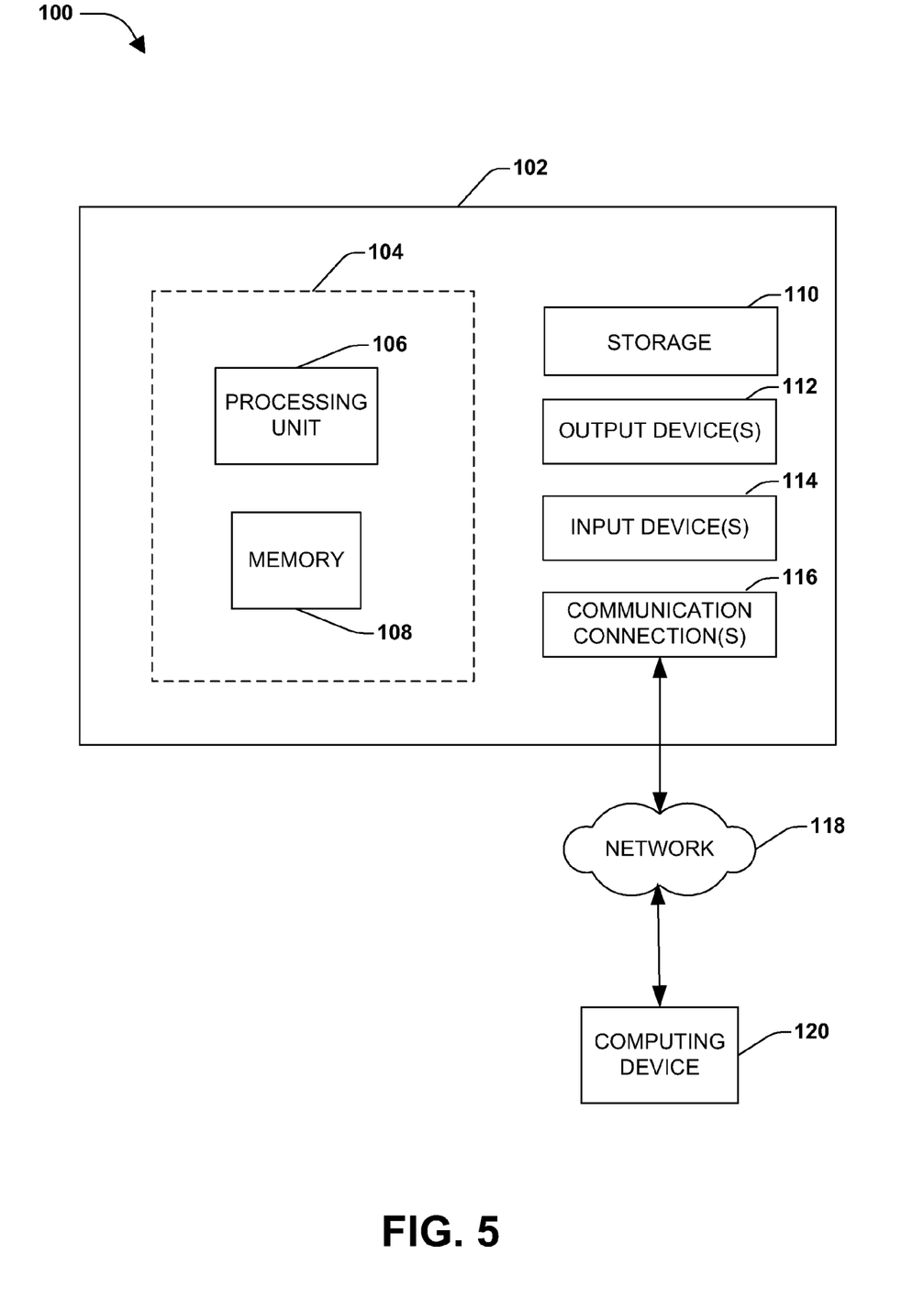
FIG. 5 illustrates an exemplary computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 illustrates an example of a system 100 comprising a computing device 102 configured to implement one or more embodiments provided herein. In one configuration, computing device 102 includes at least one processing unit 106 and memory 108. Depending on the exact configuration and type of computing device, memory 108 may be volatile (such as RAM, for example), non-volatile (such as ROM, flash memory, etc., for example) or some combination of the two. This configuration is illustrated in FIG. 5 by dashed line 104.

In other embodiments, device 102 may include additional features and/or functionality. For example, device 102 may also include additional storage (e.g., removable and/or non-removable) including, but not limited to, magnetic storage, optical storage, and the like. Such additional storage is illustrated in FIG. 5 by storage 110. In one embodiment, computer readable instructions to implement one or more embodiments provided herein may be in storage 110. Storage 110 may also store other computer readable instructions to implement an operating system, an application program, and the like. Computer readable instructions may be loaded in memory 108 for execution by processing unit 106, for example.

The term "computer readable media" as used herein includes computer storage media. Computer storage media includes volatile and nonvolatile, removable and non-removable media implemented in any method or technology for storage of information such as computer readable instructions or other data. Memory 108 and storage 110 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 102. Any such computer storage media may be part of device 102.

Device 102 may also include communication connection(s) 116 that allows device 102 to communicate with other devices. Communication connection(s) 116 may include, but is not limited to, a modem, a Network Interface Card (NIC), an integrated network interface, a radio frequency transmitter/receiver, an infrared port, a USB connection, or other interfaces for connecting computing device 102 to other computing devices. Communication connection(s) 116 may include a wired connection or a wireless connection. Communication connection(s) 116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 102 may include input device(s) 114 such as keyboard, mouse, pen, voice input device, touch input device, infrared cameras, video input devices, and/or any other input device. Output device(s) 112 such as one or more displays, speakers, printers, and/or any other output device may also be included in device 102. Input device(s) 114 and output device(s) 112 may be connected to device 102 via a wired connection, wireless connection, or any combination thereof. In one embodiment, an input device or an output device from another computing device may be used as input device(s) 114 or output device(s) 112 for computing device 102.

Components of computing device 102 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 102 may be interconnected by a network. For example, memory 108 may be comprised of multiple physical memory units located in different physical locations interconnected by a network.

Those skilled in the art will realize that storage devices utilized to store computer readable instructions may be distributed across a network. For example, a computing device 120 accessible via network 118 may store computer readable instructions to implement one or more embodiments provided herein. Computing device 102 may access computing device 120 and download a part or all of the computer readable instructions for execution. Alternatively, computing device 102 may download pieces of the computer readable instructions, as needed, or some instructions may be executed at computing device 102 and some at computing device 120.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for generating a query processing solution for a query involving a data set on a device having a processor and a memory, comprising:
   a query operator set comprising:
      at least one single-task query operator comprising instructions stored in the memory that, when executed on the processor, cause the device to perform a query task on the data set, and
      at least one multiple-task query operator comprising instructions stored in the memory that, when executed on the processor, cause the device to perform at least one query task and at least one additional query task on the data set; and
   a query operator selecting component comprising instructions stored in the memory that, when executed on the processor, cause the device to:
      for respective query terms:
         for respective multiple-task query operators:
            determine whether the at least one additional query task of the multiple-task query operator is also to be performed on the data set, and
            upon determining that the at least one additional query task is also to be performed on the data set, select the multiple-task query operator for applying the query task and the at least one additional query task to the data set; and
         upon failing to select a multiple-task query operator for the query term, select an single-task query operator for applying the query task to the data set; and
      generate the query processing solution as a sequence of selected query operators.

2. The system of claim 1, the query comprising a language-integrated query.

3. The system of claim 1, the query comprising an in-memory query against at least one queryable local object.

4. The system of claim 1, the query processing solution comprising an expression tree specifying the sequence operators corresponding to the query terms of the query.

5. The system of claim 1, the query operator set further comprising at least one specialization criterion of a specialized query operator specifying at least two query tasks specified in at least two query terms.

6. The system of claim 5, the instructions of the query operator selecting component further causing the device to:
   identify specialized query operators handling at least two query tasks specified in at least two query terms of the query; and
   upon identifying a specialized query operator, select the specialized query operator for the at least two query terms of the query.

7. The system of claim 1, at least one specialization criterion of a specialized query operator specifying at least one data type involved in the query task.

8. The system of claim 7, the query operator set comprising:
   a first specialized query operator specifying a query task involving a first data type, and
   a second specialized query operator specifying the query task involving a second data type that is more specific than the first data type of the first specialized query operator.

9. The system of claim 7, the at least one specialized query operator specifying a query task comprising a data set type-casting with respect to a data type.

10. The system of claim 9, the query task applying to the data set comprising objects of the data type.

11. The system of claim 7, the query task based on at least one data type property of the data set.

12. The system of claim 1, comprising:
   a data store targeted by the query, and
   a query applying component configured to apply the query processing solution to the data store.

13. The system of claim 1, at least one query operator generated by at least one data type of a data set involved in the query.

14. The system of claim 1, wherein at least one multiple-task query operator is configured to perform at least one additional query task on the data set before performing the query task on the data set.

15. The system of claim 1, wherein at least one multiple-task query operator is configured to perform at least one additional query task on the data set upon completing the query task on the data set.

16. The system of claim 1, wherein at least one multiple-task query operator is configured to perform at least one additional query task on the data set while concurrently performing the query task on the data set.

17. The system of claim 1, wherein at least one multiple-task query operator is configured to perform at least one additional query task on the data set upon failing to complete the query task on the data set.

18. The system of claim 1:
   at least one additional query task of the multiple-task query operator specified by a second query term of the query; and
   the instructions of the query operator selecting component further causing the device to select the multiple-task query operator for the query term and the second query term.

19. A method of generating a query processing solution for a query from a query operator set comprising at least one query operator configured to perform at least one query task on a data set, the method comprising:

for respective query terms:
for respective multiple-task query operators respectively configured to perform the query task and at least one additional query task on the data set:
determining whether the at least one additional query task of the multiple-task query operator is also to be performed on the data set, and
upon determining that the additional query task is also to be performed on the data set, selecting the multiple-task query operator for applying the query task and the at least one additional query task to the data set; and
upon failing to select a multiple-task query operator for the query term, selecting a single-task query operator for applying the query task to the data set; and
generating the query processing solution as a sequence of selected query term operators.

20. A nonvolatile computer-readable storage device comprising instructions that, when executed on a processor of a device, cause the device to generate a query processing solution for a query from a query operator set comprising at least one query operator configured to perform at least one query task on a data set, by:

for respective query terms:
for respective multiple-task query operators respectively configured to perform the query task and at least one additional query task on the data set:
determine whether the at least one additional query task of the multiple-task query operator is also to be performed on the data set, and
upon determining that the additional query task is also to be performed on the data set, selecting the multiple-task query operator for applying the query task and the at least one additional query task to the data set; and
upon failing to select a multiple-task query operator for the query term, selecting a single-task query operator applying the query task to the data set; and
generating the query processing solution as a sequence of selected query term operators.

* * * * *